Patented Dec. 3, 1946

2,411,989

UNITED STATES PATENT OFFICE 2,411,989

PAPER COATING

Henry V. Dunham, Bainbridge, N. Y., assignor to The Borden Company, New York, N. Y., a corporation of New Jersey No Drawing. Application February 5, 1942, Serial No. 429,680

9 Claims. (Cl. 117—156)

This invention has for its object the use of certain well defined constituents present in seeds of relatively high protein content, such as for example soybean, peanut, cottonseed, sunflower and the like in the manufacture of coated paper, wall papers and the like. I have found that such products derived from certain portions of high protein seeds are very suitable for use in the making of coated papers, wall papers and the like, e. g., the sizing of coated paper in connection with mineral fillers and pigments.

One object of this invention is to utilize a high protein seed residue which has been substantially increased in protein content above the protein content of the unenriched seed meal as ordinarily obtained.

Another object is to utilize for paper coating purposes a seed residue of relatively high protein content as distinguished from the seed residue prior to its enrichment as heretofore used in coating. The process is sharply distinguished from the use of chemically isolated seed meal proteins, several processes for which have been heretofore proposed.

A further object is to provide a means for utilizing the product of this invention in a simple and easy manner.

Another object is the utilization of the seed reduce of increased protein content for paper coating, without greatly changing the character and properties of the major portion of the protein present in the seed substance, as would occur by chemical reaction.

A still further object is to obtain greater adhesive values for paper coating over and above the adhesive values of the raw material heretofore employed in utilization of seed meal products for paper coating.

Other objects will be apparent to those skilled in the art.

In describing the process and its results for the purpose of this application, I shall refer to products made from commercially de-oiled, relatively high protein content soybean meal as the raw material used in many of my tests in developing this process, although in general, the same methods may be used and similar results secured, using other high protein seed substances such as peanut meal, cottonseed meal, sunflower seed meal and the like. In all cases, the object of this process is to utilize, as a starting material, the de-oiled commercial high protein seed meals.

The process of de-oiling seed meals is well known in the art. There are three commercially used methods for removing the oil from high protein seed meals. One method is known as the extraction process, where the seeds are crushed and extracted with a highly volatile oil solvent such as hexane. Another process, known as the hydraulic process, relates to crushing the beans or seeds, heating to various degrees, and compressing with an hydraulic press to remove the oil. A third process is of the expeller type, wherein the beans or seeds are run through an expeller at various degrees of temperature. Under the expeller process high pressure is applied to the seeds by means of a screw in the expeller chamber, with the result that the oil is pressed from the seeds and the relatively oil-free meal expelled from the expeller. In general, a solvent extracted meal will analyze very low in oil, only about 0.5% in many cases remaining in the meal. By the hydraulic or expeller processes the resulting meals may contain from 4 to perhaps 7 to 8% oil remaining in the meal. Any of the meals resulting from the above mentioned processes are suitable for utilization in my invention, although I prefer seed meals resulting from low temperature treatment of the seed rather than high temperature.

In the utilization of products relating to this invention, I find that products produced from cottonseed, peanut, or sunflower meal usually result in producing a rather dark colored product. Often for the purposes of this invention a light colored material is desired. Because of the above, in most cases I use soybean meal of light color as the starting material. In some types of coated paper it would be undesirable to use these dark colored products because of color, although for dark coated papers this would not be objectionable.

In general, my invention consists in the use of a high protein seed substance from which a major portion of substances soluble in weak acid solutions, and in solutions of certain types of salts, as mentioned below, have been removed, and these substances which are removed with such solutions I shall refer to as "gummy substances." After the gummy substances have been removed from the seed residue, the degummed material may be dried or washed and dried, and finally ground when it is ready to be used as a glue or adhesive for paper coating purposes. Many acids, acid salts, and some normal or neutral salts, when used in very weak solutions in water, have the property of retarding or preventing solution or undue swelling of the major portion of the protein (including water-soluble protein and water-insoluble protein) present in the de-oiled seed residue, but permit certain substances (gummy substances) in the seed residues to dissolve without dissolving the major portion of the protein material present in the meal. Thus, it is quite simple in commercial operations to remove the major portion of these gummy substances from the seed residue, without dissolving much of the proteins therefrom. This treated product is preferably then dried and ground. The product is then in an excellent physical condition for handling (drying) in commercial operations. It is not in a sticky, excessively swollen condition as would be the case if water were substituted for the extracting solution referred to above. This step of removing the material which I refer to as gummy substance from seeds of high protein content has been referred to in the literature as a means of preparing such seed residues for the isolation of protein. That is to say (in a prior process), after the degumming treatment, the material has then been treated with a protein solvent in the presence of water to dissolve the protein portion of the seed residue. Thereafter the rather dilute protein solution has been filtered or otherwise separated from the finely suspended insoluble substance present in the seed residue substance, and which is not dissolved by any of the protein solvents. After removing all, or substantially all, of the insoluble substance by means of a filter press, a centrifugal, or some satisfactory mechanical means, the protein solution has been dried by any of the convenient methods such as spray drying and the like, or the solution has been concentrated to a greater or less extent (in vacuum, for example), and utilized in that condition. Furthermore, the protein has been precipitated from such solutions by the action of acids or acid salts. In the latter case, the precipitate is allowed to settle out as much as possible, the supernatant liquid removed, the precipitated material pressed, dried and ground. This latter product is commonly referred to as a "chemically isolated precipitated protein."

I make no claim for any of the procedures outlined above wherein the suspended insoluble material is removed from the protein solution. Neither do I make any claim herein for the process per se, of extracting the gummy substances from seed residues by the utilization of any particular salt or acid. My invention involves also the use of the degummed material as outlined above, preferably produced as described herein, without the removal of the other non-protein substances which are ordinarily removed only by dissolving the protein in a protein solvent, and filtering or otherwise removing the suspended insoluble material therefrom, and thereafter further treatment of the same by concentration or drying, and the like, and the incorporation thereof with fillers, pigments, etc.

It will be understood that in my present process, the hulls or husks of the seeds are largely removed at any suitable stage of the process. This can in many cases be accomplished prior to the de-oiling of the seed material.

In many cases the seed meal is "mechanically mill refined" by purely mechanical operations including grinding, sieving and blowing operations, and the like to separate some of the fibrous material (which step may give an increase in the protein content of the seed meal material say from 40–44% up to 47–54% protein content, also giving a "protein-poor" material that may be suitable as a stock feed). Or in some cases such removal of fibrous material can be accomplished later on, after the degumming process.

In order to better illustrate this invention, and to show how the same can be performed, I give herewith the following data and examples. Unless otherwise specified, all parts mentioned in the examples are by weight.

EXAMPLE I

The following ingredients are employed:

100 pounds of the so called "mechanically mill refined" soybean meal analyzing 54% protein, which has been finely ground.

1000 pounds of degumming solution containing 4.5 pounds of dissolved ammonium bifluoride.

The procedure is as follows:

Into a suitable mixer in which a rather slow agitation is provided, say an agitator rotating at 30 to 60 R. P. M., I place the 1000 pounds of degumming solution, which may be at or below room temperature. Thereafter I add the 100 pounds of soybean meal, the mixer is started, and the agitation continued without heating the same, for approximately 30 minutes. Thereafter the mixing apparatus is stopped, the material allowed to settle for about an hour, after which time it will be found that a large portion of the insoluble residue or degummed material will have settled to the bottom of the mixer. The supernatant liquid is drawn off as much as possible without removing appreciable quantities of any suspended degummed material. Thereafter the balance of the material which contains the solids or degummed material and a portion of the liquid degumming solution containing the gummy substances may be run through a filter press or placed in a hydraulic press, or may be put through a centrifugal to remove the greater portion of the remaining gummy substances in the degumming solution. The solid undissolved material can also be given a water wash, if desired. The liquid can be separated from the undissolved degummed material in any suitable manner. The resulting pressed cake of degummed material is broken up, preferably by putting it through an ordinary casein picker which breaks the cake into relatively small pieces in order that the same may dry rapidly.

The drying operation may be carried out by any convenient means, such as utilization of an ordinary continuous casein drier, or the material may be dried in a casein tunnel drier, or by any other suitable drying method. I prefer that the material be dried at a temperature of not more than 150° F., although this exact temperature is not absolutely essential. After the degummed material is thoroughly dry it is ground to a powder, for example 80 mesh, or finer if desired, when it is ready to use as an adhesive in paper coating compositions.

During the treatment with the degumming solution, the gums, sugars, some coloring matter and perhaps other substances, all of which are herein included under the term "gummy material," are removed; but only very little of the protein is removed from the seed material during the degumming treatment. Since the constituents so removed appear to be largely carbohydrates, the per cent of protein in the leached and dried residue will be found to have been increased up to about 60 to 73% (usually 67 to 71%).

This dried material is then ready to be shipped to a paper-coating mill, wall paper factory, etc.

Various other methods for the degumming of seed meals are given in the following examples, together with tables showing analyses on the resulting products, etc. In every case the protein figures appearing in the analyses are based on calculating the nitrogen on a moisture-free sample and multiplying by the conversion factor 6.25.

In this and the other examples given, the degummed material prior to drying may, if so desired, be washed with water to further remove small amounts of the gummy substances which would not be removed by simply pressing the degummed material in a filter press or by other means. This may be accomplished by any desired means, as, for example, by use of continuous filters which are now on the market. Some of these include a rotating drum covered with cloth, and inside of which there is produced a vacuum. The drum rotating in a suspension of the degummed material and the gummy solution, that is, prior to any separation, picks up due to the vacuum a uniform layer of the degummed material, and as the drum slowly revolves, the interior suction causes the solution of gummy materials to be sucked away from the degummed material, to the point where there is, e. g. about 70% of moisture still present in the cake as it comes from the revolving drum. Now if one desires, there may be applied a spray of water at some point on this vacuum drum and thus wash the degummed material. Of course other methods of separation and/or washing would be possible. Thus in Example I, after removing the supernatant liquid as described, a volume of water can be added, to wash the degummed material. Thereafter the degummed material can be allowed to settle without becoming sticky or gummy because of the removal of most of the gummy substances. Then the wash water can be drawn off, and the resulting mass then pressed and dried in any suitable manner. Any other suitable means may be used if desired for washing the degummed material.

It will be apparent that the removal of all the gummy material, if no substantial amount of proteins is removed, will increase the percentage of protein in the product, in contrast to the removal of a part only of the gummy material.

EXAMPLE II

Same procedure as indicated in Example I with the exception that a high grade soybean meal was used as the raw material, analyzing 51.3% protein, and showing a fiber content of approximately 7%. This is a solvent extracted type meal, and the product used was in an unground form, that is to say, in a flake form.

EXAMPLE III

Same procedure as in Example I, with the exception that the raw material used was unground flakes of solvent-extracted soybean, showing a protein content of 49.2%.

EXAMPLE IV

Same procedure as in Example I, with the exception that there was used a soybean meal analyzing 51.8% protein, and which is believed to have been a solvent extracted type of meal.

EXAMPLE V

Same procedure as in Example I with the exception that a soybean meal was used showing by analysis 57.5% protein, and a low fiber content, namely approximately 0.5%. This was a solvent-extracted meal.

EXAMPLE VI

Same procedure as in Example I, but using a soybean meal showing a protein content of 49.7%, the meal being prepared by what is known as the expeller process, showing a fiber content of approximately 7%, and an oil content of about 0.5%.

EXAMPLE VII

Same procedure as in Example I, with the exception that a high grade oil extracted peanut meal was substituted for a soy product as the raw material.

EXAMPLE VIII

Same procedure as in Example I, with the exception that a high grade cottonseed meal was substituted for the soybean meal as the raw material.

EXAMPLE IX

Same procedure as in Example I, with the exception that a South American pressed type of sunflower meal was used in place of soybean meal as the raw material.

EXAMPLE X

Same procedure as in Example I with the exception that the soybean meal was first added to cold water in the proportions indicated (i. e. 100 lbs. of meal to 1000 lbs. of water), thoroughly mixed for about 5 minutes, and thereafter the dissolved ammonium bifluoride, 4.5 pounds, was added to the mixture, and the procedure continued as in Example I. I consider this procedure to be less advisable than that given in Example I.

By the above procedure, Example X, a considerable amount of the water soluble protein originally present in the raw material is dissolved in the water, since the solvent retarding degumming chemical is not present in the mix at the beginning of the treatment, but after the addition of the degumming chemical (ammonium bifluoride) the water soluble protein as such appears to be substantially all (or mostly) precipitated by the addition of degumming material and after properly mixing and allowing the mix to stand. At this stage the supernatant liquid is about the same in appearance as in Example I, but the settling of the degummed material is somewhat less rapid after the mixing operation than when the degumming chemical is added to the water prior to the addition of the material to be degummed, although there is no difficulty encountered in filtering the degummed material or pressing out the excess liquid as described in the operation under Example I. As has been indicated, other degumming chemicals may be used, and the utilization of the ammonium bifluoride in the examples cited above are only by way of illustration.

The results as to increase in protein content over the raw material, raise of protein obtained by the treatment, yield of the degummed material based on the raw material used, and per cent of raw material retained in the treated degummed material appear in Table I, given below.

Many different degumming chemicals have been used in my researches, and the results have shown substantially the same quality of degummed material from the standpoint of its subsequent use as a sizing in coated paper. To more fully illustrate the results that may be obtained with other degumming chemicals I give the following examples:

Example XI

Same procedure as Example X, with the exception that 3.7 pounds of sulphur dioxide gas were substituted in this test for the ammonium bifluoride indicated in Example X.

Example XII

Same as Example I, with the exception that the degumming solution was made with 3 pounds of phosphorous acid in place of the ammonium bifluoride.

Example XIII

Same as Example X except that the degumming solution was made with 4.4 pounds of commercial hydrochloric acid having a specific gravity of 1.18 to 1.19 in place of the ammonium bifluoride as the degumming agent. It will be noted that this gives hydrochloric acid solution of about 0.155% to 0.17% strength.

Example XIV

Same as Example I, except that the degumming solution was made with 4.2 pounds of glacial acetic acid as the degumming chemical.

Example XV

Same procedure as in Example I except that the degumming solution was made with 5 pounds of tartaric acid as the degumming chemical in place of the ammonium bifluoride.

Example XVI

Same procedure as in Example I excepting that the degumming chemical used was 6 pounds of citric acid as the degumming chemical.

Example XVII

Same procedure as in Example I except that the degumming solution was made with 4 pounds of oxalic acid in place of the ammonium bifluoride.

Example XVIII

Same as Example I with the exception that the degumming solution was made with 6 pounds of tin chloride (stannous chloride) instead of ammonium bifluoride.

Example XIX

Same procedure as in Example I with the exception that the degumming solution was made with 10 pounds of magnesium chloride in place of the ammonium bifluoride.

Example XX

Same as Example X with the exception that the degumming solution was made with 5 pounds of calcium sulphate in place of the ammonium bifluoride.

Example XXI

Same as Example X with the exception that the degumming solution was made with 5 pounds of magnesium silico-fluoride in place of the ammonium bifluoride.

Example XXII

Same as Example X with the exception that the degumming solution used was 5 pounds of mono calcium phosphate in place of the ammonium bifluoride.

Example XXIII

Same as Example X with the exception that the degumming solution was made with 5 pounds of neutral sodium fluoride in place of the ammonium bifluoride.

Example XXIV

Same procedure as in Example I with the exception that the degumming solution was made with 3.8 pounds of hydrochloric acid having a specific gravity of 1.18 to 1.19, and 3.3 pounds of tin chloride (stannous chloride) in place of the use of ammonium bifluoride.

Example XXV

Same procedure as in Example X with the exception that the degumming solution was made with 6 pounds of hydrochloric acid having a specific gravity of 1.18 to 1.19, said hydrochloric acid being saturated with calcium fluoride prior to its addition to the mixture of meal and water, indicated in Example X, and this mixture was used as the degumming chemical.

Example XXVI

Same procedure as in Example I with the exception that the degumming solution was made with 12.5 pounds of saturated solution of citric acid and lead chloride in which the ratio of the citric acid to the lead chloride was as 5 to 1. Said mixture of acid and the salt was added to the diluting water in the proportions indicated in Example I in place of the ammonium bifluoride.

Example XXVII

Same procedure as in Example I, with the exception that the degumming solution was made with 25 pounds of acetin and 6.3 pounds of glacial acetic acid in the place of the ammonium bifluoride used in Example X.

Example XXVIII

Same procedure as in Example X with the exception that the degumming solution was made with 8.5 pounds of a mixture of triethanolamine and glacial acetic acid, the mixture being prepared by the addition of sufficient glacial acetic acid to the triethanolamine so that the resulting mixture had a pH of 3.9, and this degumming chemical was substituted for the ammonium bifluoride.

The analyses, yields, etc., resulting from examples XI to XXVIII inclusive, are indicated in Table II, given below. It should be noted that the various examples listed above were made at a temperature of approximately 60 to 70° F., room temperature, 100 pounds of meal and 1000 pounds of water. Other examples are given, however, with different temperatures used during the degumming process as illustrated by the following examples.

Example XXIX

Same procedure as Example I, with the exception that the degumming solution was made with 2.1 pounds of sulphur dioxide gas, and the degumming solution maintained at a temperature of 110° F.

Example XXX

Same procedure as Example I with the exception that the degumming solution was made with 2 pounds of sulphur dioxide gas, and the degumming solution was maintained at a temperature of 160° F.

Example XXXI

Same procedure as Example I with the exception that the degumming solution was made with 2 pounds of sulphur dioxide gas, and that the degumming solution during the process was maintained at a temperature of 180° F.

Example XXXII

Same procedure as indicated in Example X with the exception that the degumming solution was made with 5 pounds of hydrochloric acid having a specific gravity of 1.18 to 1.19, and that the degumming solution was maintained throughout at a temperature of 100° F. The degumming solution accordingly contains about 0.18 to 0.19% HCl.

Example XXXIII

Same as Example X, with the exception that the degumming solution was made with 3.4 pounds of glacial acetic acid, and that the degumming was carried out at a temperature of 130° F.

Example XXXIV

Same procedure as Example X with the exception that the degumming solution was made with 5.6 pounds of glacial acetic acid, and that the degumming solution was maintained throughout the operations of degumming at a temperature of 190° F.

Example XXXV

Same procedure as Example X with the exception that the degumming solution was made with 5 pounds of ammonium bifluoride and that the degumming solution was maintained throughout the operations of degumming at a temperature of 180° F.

The Table III given below, is a tabulation of the analyses, yields, etc., obtained from the procedure as described under Examples XXIX to XXXV, inclusive.

Generally, there appears to be no substantial advantage now apparent in the use of temperatures above room temperature (60–80° F.) in the degumming treatment. There are some disadvantages in the use of heat in this treatment, notably that when the degumming treatment is effected at 30° F., the final coating solution has somewhat better flowing properties, when applied to the paper.

It will be noted that in the examples thus far given, the amount of water used was on the basis of approximately 1000 parts of water to 100 parts of the meal to be treated. However, the water ratio may be adjusted to obtain the most favorable factory handling conditions during the degumming process without materially changing the quality of the treated degummed seed materials. The following examples illustrate the use of less quantities of water during the degumming process:

Example XXXVI

Same procedure as Example I except that the degumming solution was made with 3.2 pounds of sulphur dioxide gas added to 500 pounds of water.

Example XXXVII

Same procedure as Example I except that the degumming solution was made with 2.5 pounds of sulphur dioxide gas and 500 pounds of water.

Example XXXVIII

Same procedure as in Example 1, with the exception that the degumming solution was made with 4.4 pounds of glacial acetic acid using 500 pounds of water instead of 1000 pounds of water.

Example XXXIX

Same procedure as in Example I, except that the degumming solution was made by using 500 pounds of water instead of 1000 pounds of water.

Example XL

Same procedure as in Example I, with the exception that the degumming solution was made with 6 pounds of tin chloride (stannous chloride) and 500 pounds of water.

The analysis, yields, etc., the washed products of Examples XXXVI to XL inclusive are indicated in Table IV.

Based on the above and other experiments, I believe it would be readily possible to use even smaller amounts of water, in the degumming treatment, e. g., 400 of water to 100 of the seed meal.

In order to demonstrate the improved adhesive value of the degummed material from the standpoint of paper coating the following results are given. The finely ground degummed and dried material which may be ground to any desired mesh, for example 80 mesh or finer, and made for instance according to the method described in Example I, is mixed with cold water, the particles thoroughly wetted, and the mixture may be allowed to soak in water for a short time, say 15 or 20 minutes. (Here, as above, all parts are given by weight.) Thereafter an alkaline material (or protein solvent as is the usual accepted term for such substances) is added to this mixture, the mixture then thoroughly stirred, and preferably heated to about 120 or 130° F., while stirring to assist in the dissolving. When the degummed substance is dissolved, with the exception of the suspended insoluble non-protein material, it is ready to be used as a sizing for paper coatings. The exact proportions in preparing the liquid size from the degummed material and in the preparation of the regular seed meal size, for comparative purposes, is as follows:

| | Parts |
|---|---|
| Degummed material | 100 |
| Water | 500 |
| 10% solution of sodium hydroxide | 100 |

Here, as will be noted, 100 parts of a 10% solution of caustic soda is mixed with 500 parts of water, to form a mild (1.67%) solution of caustic soda which is used as the solvent or vehicle for the degummed material and pigmentary material.

For preparing the paper coating mixture, (which is ordinarily referred to as "coating color" whether the pigment and filler are colored or white), the following formula was used:

| | Parts |
|---|---|
| Clay | 100 |
| Water | 100 |
| Liquid size | 126 |

The clay is added to the water and mixed until a smooth slip is formed. The liquid size is then introduced and mixed until smooth and until the clay is completely dispersed. The above proportions give a concentration of 18 parts of dry sizing material to 100 parts of dry clay.

The prepared paper coating color is preferably strained through an 80 to 100 mesh wire screen and thereafter brushed on to the type of paper ordinarily used in the paper coating industry, or applied to the paper by some coating machine such as for example the laboratory coating machine known as the Martinson, wherein an exact amount of the coating color can be applied per unit area in each test. After the sheets of paper have been coated they are allowed to dry and to season for approximately 18 hours in an air-conditioned room with a relative humidity of 50%, and a temperature of 70° F., in order to maintain uniform conditions during the test period. After the proper aging of the coated sheets their relative qualities were tested. In my tests I have employed the almost universal procedure known as the Dennison wax test, which may be described as follows:

The end of the wax stick is softened by holding over a flame. The softened end is then pressed by hand against the coated surface to be tested, using moderate pressure. The wax is allowed to cool and harden. Then it is pulled away from the surface of the paper. The wax sticks are supplied in graduated degrees of hardness, the lowest number being the softest and giving the least pull on the paper surface, the higher numbers becoming progressively harder and giving more pull to the surface. By applying a series of the wax sticks to the paper, a point will be found where no failure of the coating or paper stock takes place with a given wax stick, but when applying the next harder wax stick there will be failure. The end point of the test (the number recorded to indicate the strength of sizing in the coating) is the number of the hardest wax which does not cause failure.

Coated sheets were prepared and tested, as described above, coated with colors prepared from the products of several of the above examples as the sizing material for the clay. Papers coated with several untreated seed meals were tested for comparison. The results of these tests are tabulated and appear in Table V, below.

It will be noted that there is a very large increase in the adhesive value of the sheets coated with my degummed product as compared with the sheets coated with the raw seed meals used in preparing the degummed material.

It will be understood that the above examples of paper coating are for the purpose of illustration only. I do not restrict the invention to grinding the degummed material to 80 mesh or finer. Thus in Example II, the product was treated by the degumming process in the unground or flake form. This coarser material has the advantage that it does not tend to lump or ball up when mixed with water and the acidic degumming material. Furthermore, after proper treatment, such coarse degummed flake material settles from the supernatant liquid more rapidly than a finer ground material would do. It should be borne in mind, however, that if the unground or flake form of material has been treated either with or without a considerable proportion of the outside shell or hull of the bean, that the resulting degummed dried material is thereafter ground by any suitable meal refining method to remove the major portion of the outside shells or husks of the bean, and at the same time reduce the remaining material to a relatively fine mesh, preferably 80 mesh or finer. This relatively fine ground condition, in the finished product is important from the standpoint of its use for paper coating purposes. The coarser the finished material may be, the more slowly will it dissolve or disperse in the alkaline solvent in the presence of water when being prepared for paper coating purposes. I do not restrict the invention to the particular alkali mentioned (numerous others, including trisodium phosphate, ammonia, sodium carbonate, etc., can be used). I do not restrict the invention to the use of clay, water and size only, in the "coating color" since colored pigments, dyes, etc., can be added, and the clay can be substituted by satin white, calcium carbonate, and other fillers. Such pigments, dyes and fillers will hereinafter be referred to for brevity, as "a suspended pigmentary material." The degummed material made as described in this specification may if desired be mixed with other adhesive materials for paper coating purposes such as combinations of casein, animal glue, modified starches, and the like in such proportions as might be desired. Of the protein solvents mentioned, caustic alkali (e. g. NaOH) seems to be better than the others tested.

The above mentioned and similar seeds in their original condition include cellulose in two distinct forms, namely (a) a hull or shell composed of one or several layers, which hull is composed largely of cellulose in a relatively tough and useless condition and (b) cell walls in the interior or kernel of the seed, which latter is softer, and less tough in character. The former will be referred to as "hull," and the latter as "non-hull cellulose," for brevity. In the process of the present case, the "hull" is all or substantially all removed from the seed material during the processing, whereas the "non-hull cellulose" is not removed, at least to any considerable extent, and remains in the treated dried product. In the process very little of the protein content of the seedmeal is dissolved out and very little of the "non-hull cellulose" is removed, and accordingly the ratio of protein to non-hull cellulose, as originally existing in the seedmeal and in the mechanically mill refined material practically is substantially preserved throughout the treatment.

TABLE I

*Degumming treatment of various seed meals with 4.5 parts of ammonium bifluoride per 100 parts of meal and 1000 parts of water*

| Example number | Raw material treated | Percent protein in raw material | Percent protein in degummed material | Rise in percent of protein | Percent yield on raw material | Percent protein retained [2] |
|---|---|---|---|---|---|---|
| I | Soybean meal | 53.0 | 70.3 | 17.3 | 65.0 | 86.2 |
| II | do | 51.3 | 62.4 | 11.1 | 81.8 | 99.6 |
| III | do | 49.2 | 63.1 | 13.9 | 78.0 | 100 |
| IV | do | 51.8 | 64.4 | 12.6 | 79.8 | 99.2 |
| V | do | 57.5 | 68.6 | 11.1 | 76.1 | 90.9 |
| VI | do | 49.7 | 63.5 | 13.8 | 76.5 | 97.6 |
| VII [1] | Peanut meal | 64.2 | 74.3 | 10.1 | 84.0 | 97.3 |
| VIII | Cottonseed meal | 48.2 | 58.8 | 10.6 | 80.2 | 98.0 |
| IX | Sunflower meal (pressed) | 46.3 | 53.8 | 7.5 | 84.3 | 97.7 |
| X | Soybean meal | 53.0 | 69.0 | 16.0 | 65.1 | 85.0 |

[1] Used 5.0 parts of ammonium bifluoride.
[2] Moisture contents disregarded in values.

TABLE II

Degumming treatment of soybean meal (from the same lot) having 53.0 per cent protein with various chemicals and chemical mixtures

| Example number | Chemical used in degumming treatment | Degumming chemical percent of meal | Percent protein in degummed material | Rise in percent protein produced | Percent yield in degummed meal | Percent of total protein in raw material retained |
|---|---|---|---|---|---|---|
| XI | Sulphur dioxide gas | 3.7 | 69.8 | 16.8 | 66.0 | 86.8 |
| XII | Phosphorous acid | 3.0 | 69.7 | 16.7 | 69.5 | 91.4 |
| XIII | Hydrochloric acid | 4.4 | 70.9 | 17.9 | | |
| XIV | Acetic acid | 4.2 | 70.1 | 17.1 | | |
| XV | Tartaric acid | 5.0 | 68.6 | 15.6 | 61.2 | 79.3 |
| XVI | Citric acid | 6.0 | 69.8 | 16.8 | 65.1 | 85.7 |
| XVII | Oxalic acid | 4.0 | 70.3 | 17.3 | 67.0 | 88.8 |
| XVIII | Tin chloride | 6.0 | 63.9 | 10.9 | 71.1 | 85.6 |
| XIX | Magnesium chloride | 10.0 | 66.0 | 13.0 | | |
| XX | Calcium chloride | 5.0 | 62.9 | 9.9 | | |
| XXI | Magnesium silico fluoride | 5.0 | 65.8 | 12.8 | | |
| XXII | Mono calcium phosphate | 5.0 | 66.1 | 13.1 | | |
| XXIII | Sodium fluoride | 5.0 | 57.5 | 4.5 | | |
| XXIV | {Hydrochloric acid / Tin chloride} | {3.8 / 3.3} | 68.3 | 15.3 | 64.5 | 83.0 |
| XXV | Hydrochloric acid saturated with calcium fluoride | 6.0 | 69.7 | 16.7 | | |
| XXVI | Saturated solution of citric acid and lead chloride; ratio of acid to salt 5 to 1 | 12.5 | 69.6 | 16.6 | 61.6 | 79.7 |
| XXVII | {Acetine / Acetic acid} | {25.0 / 6.3} | 68.9 | 15.9 | 68.0 | 88.3 |
| XXVIII | Triethanolamine-glacial acetic acid mixture having a pH of 3.9 | 8.5 | 70.9 | 17.9 | 62.0 | 82.9 |

TABLE III

Treatment of soybean meal of 53.0% protein content with various chemicals and 1000 parts of water to 100 parts of meal at higher temperatures

| Example No. | Chemical used in degumming | Chemical used per cent of meal | Temperature of treatment | Per cent of protein in degummed meal | Rise of per cent protein | Per cent yield of degummed raw meal | Per cent total protein of meal retained |
|---|---|---|---|---|---|---|---|
| | | | °F. | | | | |
| XXIX | Sulphur dioxide gas | 2.0 | 110 | 68.8 | 15.8 | 63.6 | 82.6 |
| XXX | do | 2.0 | 160 | 70.6 | 17.6 | 65.0 | 86.6 |
| XXXI | do | 2.0 | 180 | 68.1 | 15.1 | 68.5 | 88.1 |
| XXXII | Hydrochloric acid | 5.0 | 100 | 70.6 | 17.6 | | |
| XXXIII | Acetic acid | 3.4 | 130 | 75.0 | 22.0 | 70.6 | 100.0 |
| XXXIV | do | 5.6 | 190 | 69.2 | 16.2 | 66.7 | 87.0 |
| XXXV | Ammonium bifluoride | 5.0 | 180 | 69.6 | 16.6 | 76.1 | 100.0 |

TABLE IV

Degumming treatment of soybean meal having 53.0 per cent protein with 500 parts of water and 100 parts of meal and various chemicals

| Example No. | Chemical used | Chemical per 100 of meal | Percent protein degummed | Rise in per cent protein | Percent yield on meal | Percent of protein retained in degummed |
|---|---|---|---|---|---|---|
| XXXVI | Sulphur dioxide | 3.2 | 69.5 | 16.5 | 70.0 | 91.7 |
| XXXVII | do | 2.5 | 69.0 | 16.0 | 63.0 | 82.0 |
| XXXVIII | Acetic acid | 4.4 | 68.2 | 15.2 | 68.3 | 87.8 |
| XXXIX | Ammonium bifluoride | 4.5 | 68.8 | 15.8 | 67.0 | 87.0 |
| XL | Tin chloride | 6.0 | 64.7 | 11.7 | 72.0 | 87.9 |

TABLE V

| Sizing material | Parts dry size | Parts dry clay | Wax test |
|---|---|---|---|
| Soybean meal (not treated) | 18 | 100 | Partial on 2.[1] |
| Product of Example I | 18 | 100 | 7. |
| Product of Example IX | 18 | 100 | 7. |
| Product of Example X | 18 | 100 | 7. |
| Product of Example XIV | 18 | 100 | 8. |
| Product of Example XI | 18 | 100 | 7. |
| Cottonseed meal (not treated) | 18 | 100 | Complete on 2.[1] |
| Cottonseed product (treated as in Example I) | 18 | 100 | 5. |
| Peanut meal (not treated) | 18 | 100 | Partial on 2.[1] |
| Peanut product (treated as in Example I) | 18 | 100 | 5. |

[1] No. 2 is lowest wax available.

The minimum wax test, for a coated paper, for a useful product for being printed upon is about 4.5 (four and a half).

I claim:

1. In paper coating, the process which consists in first leaching a high protein content seedmeal with about 4 to 10 times its own weight of an acid aqueous solution having an acid content equal to about 3.8 to 6 lbs. of hydrochloric acid solution of sp. gr. 1.18 to 1.19, per 100 lbs. of said seedmeal, thereby dissolving and removing the bulk of the carbohydrate gums, and without subjecting the said seedmeal material to a protein-denaturing treatment, mixing the degummed seedmeal material with an aqueous alkaline liquid of an alkalinity equal to about 1.67% of NaOH, and with a pigmentary material, and coating paper with said mixture.

2. A process as covered in claim 1, in which the seedmeal material is one selected from the group consisting of soybean, cottonseed, peanut, sunflower seed and mixtures thereof.

3. In the paper coating process of claim 1, the addition of a water-washing step after the leaching operation.

4. In paper coating, the process which consists in first leaching a high protein content seedmeal with several times its own weight of an acid aqueous solution having an acid content equal to about 3.8 to 6 lbs. of hydrochloric acid solution of sp. gr. 1.18 to 1.19, per 100 lbs. of said seedmeal, thereby dissolving and removing the bulk of the carbohydrate gums, and without subjecting the said seedmeal material to a protein-denaturing treatment, mixing the degummed seedmeal material with an aqueous liquid which is capable of dissolving the protein content of such material, and with a pigmentary material, and coating paper with such mixture.

5. In paper coating, the process which consists in first leaching a high protein content seedmeal with several times its own weight of an aqueous liquid which is a good solvent for carbohydrate gums contained in said seedmeal but which is less active as a solvent for water soluble proteins present in said seedmeal than is pure water, thereby dissolving and removing from said seedmeal the water soluble carbohydrates including carbohydrate gums, and without denaturing the proteins present in said seedmeal, thereafter mixing the degummed seedmeal residue with an aqueous protein-solvent liquid and with a pigmentary material, and coating a fully formed paper with the resulting liquid.

6. In the art of coating paper, the improvement which comprises separating at least the principal part of the oil content of proteinaceous oil-bearing seed material, raising the protein content of the proteinaceous solid material by the removal of cellulosic hull therefrom, leaching out gummy material therefrom by means of an extremely dilute aqueous solution of an acidulous material, corresponding in acidity to HCl solution of about 0.155 to 0.19% strength, which solution is not an effective protein solvent, but which is a solvent for water soluble carbohydrates including gums, whereby a material richer in protein than the de-oiled seed residue and low in gums and other soluble carbohydrates is produced, and at some stage of the process removing substantially all hull material, and drying the said material, while still containing substantially all of the components of the seed meal except those removed by the above steps, thereafter incorporating the degummed material with an alkaline solution which is a protein solvent, and without thereafter removing the bulk of the swollen but undissolved constituents, incorporating a paper-coloring pigmentary material with the liquid mass, and thereafter applying the same as a coating on paper.

7. In the art of coating paper, the improvement which comprises separating at least the principal part of the oil content of proteinaceous oil-bearing seed material, leaching out gummy material therefrom by means of an extremely dilute aqueous solution of an acidulous material, which aqueous solution is not an effective protein solvent, whereby a material richer in protein than the de-oiled seed residue and low in water-soluble gums and other soluble carbohydrates is produced, and at some stage of the process removing substantially all hull material, incorporating such degummed seed meal with an alkaline solution which is an effective protein solvent, and without thereafter removing the bulk of the swollen undissolved constituents, incorporating a paper-coloring pigmentary material with the liquid mass, and applying the same as a coating on paper, and drying the same.

8. In the art of coating paper, the improvement which comprises separating at least the principal part of the oil content from proteinaceous oil-bearing seed material, leaching the de-oiled material with a dilute solution of a compound containing an acid radical, which solution is a less effective solvent than water alone for water-soluble protein present in the seed residue, and which is a good solvent for soluble carbohydrates including gummy substances, whereby a material richer in protein than the de-oiled seed residue and low in water-soluble gums and other water-soluble carbohydrates is produced, and at some stage of the process removing substantially all hull material, incorporating such degummed material in which material the proteins present remain in substantially the same condition as in the original seedmeal with an alkaline solution which is an effective protein solvent, and without thereafter removing the bulk of the swollen undissolved constituents, incorporating a paper-coloring pigmentary material with the liquid mass, and applying the same as a coating on paper, and drying the same.

9. In the art of coating paper, the improvement which comprises separating at least the principal part of the oil content from proteinaceous oil-bearing material, leaching the de-oiled material with a dilute solution in which water-soluble proteins are largely insoluble and are for the most part in the undissolved state and in a condition readily soluble in alkaline casein solvents, whereby a material richer in protein than the de-oiled seed residue and low in water-soluble gums and other water-soluble carbohydrates is produced, and at some stage of the process removing substantially all hull material, incorporating such degummed material, while still containing substantially all of its protein in a chemically unmodified condition, with an alkaline solution which is an effective protein solvent, and without thereafter removing the bulk of the swollen undissolved constituents, incorporating a paper-coloring pigmentary material with the liquid mass, and applying the same as a coating on paper, and drying the same.

HENRY V. DUNHAM.

Certificate of Correction

Patent No. 2,411,989.       December 3, 1946.

HENRY V. DUNHAM

It is hereby certified that error appears in the printed specification of the above numbered patent requiring correction as follows: Column 1, line 29, for the word "reduce" read *residue*; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.*